3,405,185
PRODUCTION OF ISOMENTHOL ISOMERS
William J. Houlihan, Mountain Lakes, and Donald R. Moore, Washington Township, N.J., assignors to Universal Oil Products Company, Des Plaines, Ill., a corporation of Delaware
No Drawing. Continuation-in-part of application Ser. No. 142,770, Oct. 4, 1961. This application May 18, 1965, Ser. No. 456,803
2 Claims. (Cl. 260—631)

This application is a continuation-in-part of copending application Ser. No. 142,770, filed Oct. 4, 1961, now abandoned.

This invention relates to the preparation of isomenthol isomers by catalytically hydrogenating thymol and more specifically to an improved procedure therefor through the use of a cobalt catalyst consisting of either Raney cobalt or cobalt oxide.

The formation of menthol by the hydrogenation of thymol may be represented by the following equation:

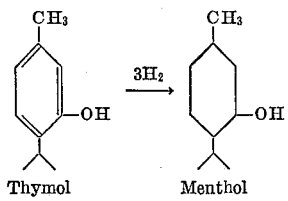

Thymol        Menthol

The above menthol compound product contains three asymmetric carbon atoms and therefore, can exist in four racemic modifications known as dl-menthol, dl-isomenthol, dl-neomenthol and dl-neoisomenthol. The graphic formulas for these compounds are:

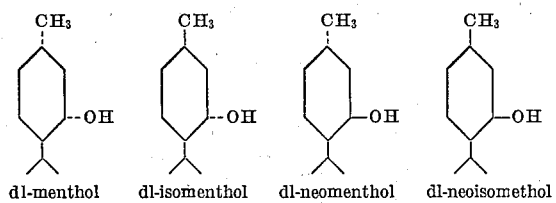

dl-menthol    dl-isomenthol    dl-neomenthol    dl-neoisomethol

In these illustrations, the dotted lines refer to groups below the plane of the cyclohexane ring and the solid lines refer to groups above the plane of the ring. As employed herein, the term "isomenthol isomers" is to be understood as referring to both dl-isomenthol and dl-neoisomenthol.

When the oxidation of the above menthol compounds is carried out under controlled conditions, dl-menthol and dl-neomenthol give dl-menthone whereas dl-isomenthol and dl-neoisomenthol give dl-isomenthone. This conversion is represented as follows:

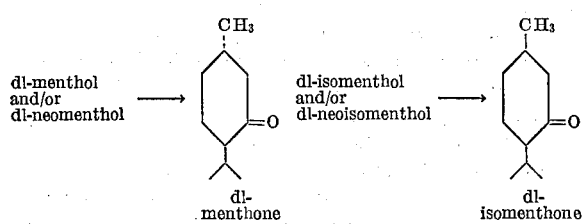

Isomenthone, both in the optically active and racemic form is more highly valued in the perfum industry than the dl-menthones and has been found to be an important constituent of geranium oil, a highly valued essential oil.

Furthermore, the presence of isomenthone in synthetic rose and geranium perfume compositions is known to impart a pleasingly fragrant character thereto. Accordingly, a satisfactory preparation of isomenthone is highly desirable and such preparation requires essentially a readily available source of the isomenthol isomer starting materials. Unfortunately, however, these particular menthol isomers have not heretofore been readily obtained by hydrogenating thymol.

The prior art for the most part has indicated that the catalytic hydrogenation of thymol gives mainly dl-menthol and dl-neomenthol. However, since much of the earlier work was carried out before the development of modern analytical techniques such as infrared spectroscopy or gas-liquid chromatography were developed, the exact composition of these menthol isomers is in doubt. Recent work may be cited from Industrial and Engineering Chemistry (vol. 39, pp. 1150–1160, 1947) where it is stated that hydrogenation of thymol in the presence of a copper-chromium catalyst gives 80% of menthol isomers and nickel on Kieselguhr gives 56% menthols. The work of Huckel in Justus Liebig's Annalen der Chemie (vol. 637, pp. 1–30, 1960) has shown that the hydrogenation of thymol in the presence of a copper chromite catalyst gives 81.3% of menthol isomers and 18.7% of isomenthol isomers whereas Raney nickel catalyst gives 40.5% menthol isomers and 59.5% isomenthol isomers; and Mohr's platinum catalyst gives 21% menthol isomers and 71% isomenthol isomers.

It has now been unexpctedly discovered, however, that the desired isomenthol isomers may be produced as the principal product of the hydrogenation of thymol through the utilization of a cobalt catalyst consisting of either Raney cobalt or cobalt oxide. While the properties and characteristics of catalysts cannot always be predicted with certainty nor their operation in any particular reaction readily explained, the remarkable activity of the Raney cobalt or cobalt oxide catalysts to effect the principal production of isomenthol isomers in the hydrogenation of thymol is most surprising and unexpected, especially in view of the fact that other cobalt containing catalysts do not exhibit a comparable level of activity.

Accordingly, it is an object of this invention to provide an improved procedure for preparing isomenthol isomers by hydrogenating thymol in the presence of a cobalt catalyst consisting of either Raney cobalt or cobalt oxide. Another object of this invention is to prepare isomenthol isomers in proportions not heretofore obtainable in the hydrogenation of thymol with other catalysts and, moreover, at such a high level of purity that the isomenthol isomers obtained in the hydrogenation may be directly oxidized to the valuable isomenthone without extensive purification. These and other objects and features of the present invention will appear from the following description thereof wherein reference is made to typical procedures and methods of operation for the purpose of indicating the nature of the invention but without intending to limit the invention thereby.

The ready obtainment, in the hydrogenation of thymol, of a product containing mostly the isomenthol isomers is to be highly desired because the close boiling points of the menthol isomers renders separation by usual means, such as distillation, impractical. Even to obtain an enriched isomenthol fraction (75%) one suffers considerable loss of isomenthol in the intermediate fractions. Enrichment of the isomenthol isomers can be accompanied to a limited degree by fractional recrystallization of a solid derivative such as phthalate ester. However, this procedure results in considerable losses and is further economically unattractive because of the necessity for subsequently regenerating the isomenthols from the phthalate or other derivative.

The use of a Raney cobalt or cobalt oxide according to this invention results in the production of principally the isomenthol isomers and thus avoids these tedious and costly procedures for obtaining substantial quantities of the isomenthol isomers. However, in addition to this highly desirable result, the isomenthol isomer hydrogenation product is so pure that it can be oxidized directly to obtain a product which may have an isomenthone content of more than 90%; a quality of isomenthone not previously available.

In using Raney cobalt or cobalt oxide to effect the hydrogenation of thymol, we have found that a product is obtained containing approximately 90% or more of the isomenthol isomers. The use of the Raney cobalt or cobalt oxide catalysts thus produce a highly selective reduction of thymol, at a level which has not heretofore been accomplished with any of the well known hydrogenation catalysts.

The Raney cobalt or cobalt oxide catalysts utilized in the process of this invention are the commercially available forms. The Raney cobalt catalyst of commerce is generally prepared by the alkali digestion of an aluminum cobalt alloy. Of the two cobalt catalysts, the most desirable results are generally obtained with the Raney cobalt and for this reason, Raney cobalt is the preferred catalyst for use in the process of this invention. The amount of catalyst required is not critical and will depend upon the conditions of temperature and hydrogen pressure under which the reaction is carried out. These conditions may be varied over a considerable range without unduly affecting the reaction. However, in general, and for most practical purposes, about 5 to 50% by weight of the cobalt catalyst based on the weight of the thymol are employed and the pressures may range from about 100 to 1200 pounds per square inch while the temperatures may vary from about 80° C. to 200° C. The reaction is generally continued until the absorption of hydrogen has ceased or for a period of from about 2 to 30 hours. Thus, a highly satisfactory reduction is obtained when thymol is hydrogenated in the presence of 10% by weight of Raney cobalt or cobalt oxide at a temperature of about 130° C. and under a hydrogen pressure of about 100 to 500 p.s.i. In general, the rate of reduction will decrease with decreasing amounts of catalyst and at lower temperatures and pressures without materially changing the amount of isomenthol isomers formed. For convenience in handling, we also prefer to use a solvent for the thymol such as isopropanol, methanol, ethanol, dioxane, and the like. However, the use of a solvent is not necessary for the success of the reaction.

In order to indicate typical procedures which may be followed in the practice of the present invention, the following examples are cited.

EXAMPLE I

A mixture of 75 gms. (0.5 mole) of commercial thymol, 33 gms. of Raney cobalt and 26 gms. of isopropanol was charged to an autoclave equipped with a stirring device. Hydrogen was added until the total pressure was approximately 900 p.s.i. and the mixture heated to about 180° C. Three equivalents (1.5 moles) of hydrogen were absorbed in approximately 3 hours, and then ceased. The autoclave was then cooled, the contents discharged, and the catalyst removed by filtration. The product isolated by distillation of the filtrate amounted to 73 gms. of B.P. 81–87° at 2 mm. This material solidifies to a crystalline mass on standing. A gas liquid chromatograph of this solid on a "Hyprose" column showed it to contain 2.7% neomenthol, 9.8% neoisomenthol, 2.7% menthol and 84.7% isomenthod. The total "isomenthol isomers" amounted therefore to 94.5%.

EXAMPLE II

A mixture of 225 gms. (1.5 moles) of commercial thymol, 22.5 gms. of Raney cobalt and 75 ml. of isopropanol was charged to an autoclave mounted on a rocking device. Hydrogen was added until the total pressure was approximately 500 p.s.i. and the mixture was heated to about 130° C. Three equivalents (4.5 moles) of hydrogen were absorbed in approximately 6.25 hours, and then ceased. The autoclave was then cooled, the contents discharged and the catalyst removed by filtration. The product isolated by distillation of the filtrate amounted to 218 gms. of B.P. 80–86° at 2 mm. This material solidified on standing. A gas-liquid chromatograph on a "Hyprose" column showed it to contain 1.2% neomenthol, 11.7% neoisomenthol, 2.1% menthol and 85.0% isomenthol. The total "isomenthol isomers" amounted, therefore, to 96.7%.

EXAMPLE III

A mixture of 75 gms. (0.5 mole) of commercial thymol, 33 gms. of Raney cobalt and 26 ml. of isopropanol was charged to an autoclave. Hydrogen was added until the total pressure was 250 p.s.i. and the mixture heated to about 105°. After the hydrogenation was completed, the autoclave was cooled and the contents discharged and filtered. Analysis of the crude filtrate by gas-liquid chromatography on a "Hyprose" column showed it to contain 3.7% neomenthol, 22.0% neoisomenthol, 3.3% menthol and 71.0% isomenthol. The total "isomenthol isomers" amounted, therefore, to 93.0%.

EXAMPLE IV

A mixture of 225 gms. (1.5 moles) of commercial thymol, 22.5 gms. of cobalt oxide catalyst and 75 ml. of isopropanel was charged to an autoclave mounted on a rocking device. Hydrogen was added until the total pressure was approximately 500 p.s.i. and the mixture was heated to about 130° C. Three equivalents (4.5 moles) of hydrogen was absorbed in approximately 6 hours, and then ceased. The autoclave was then cooled, the contents discharged and the catalyst removed by filtration. The product isolated by distillation of the filtrate amounted to 220 gms. of B.P. 79–84° at 1 mm. This material solidified to a crystalline mass on standing. A gas-liquid chromatograph on a "Hyprose" column showed it to contain 5.0% neomenthol, 10.7% neoisomenthol, 7.8% menthol and 76.5% isomenthol. The total "isomenthol isomers" amounted, therefore, to 87.2%.

EXAMPLE V

A mixture of 75 gms. (0.5 mole) of commercial thymol and 7.5 gms. of Raney cobalt was charged to an autoclave equipped with a plunging-type agitator. Hydrogen was added until the total pressure is 300 p.s.i. and the mixture was heated to about 135° C. Three equivalents of hydrogen (1.5 moles) were absorbed in approximately 7.6 hours. The autoclave was then cooled, the contents discharged and the catalyst removed by filtration. Analysis of the crude filtrate by gas-liquid chromatography on a "Hyprose" column showed it to contain 3.6% neomenthol, 4.6% neoisomenthol, 5.7% menthol and 86.1% isomenthol. The total "isomenthol isomers" amounted, therefore, to 90.7%.

EXAMPLE VI

In this example, thymol was hydrogenated in the presence of a cobalt catalyst other than either the Raney cobalt or cobalt oxide catalysts of this invention. The following results obtained therewith may be contrasted with those of Examples I to V to demonstrate the unusual activity of the Raney cobalt or cobalt oxide catalysts in preparing isomenthol isomers in contrast to even other cobalt catalysts:

A mixture of 450 gms. (3.0 moles) of commercial thymol, 67.5 gms. of a commercially available cobalt catalyst (Harshaw Company, "Cobalt-0104T"), and 200 milliliters of isopropanol was charged to an autoclave mounted on a rocking device. Hydrogen was added until the total pressure was approximately 500 p.s.i. and the mixture was heated to about 150° C. Three equivalents (9.0 moles) of hydrogen were absorbed in approximately 23 hours. The autoclave was cooled, the contents discharged and the catalyst removed by filtration. Analysis of the crude filtrate by gas liquid chromatography on a "Hyprose" column showed it to contain 6.3% neomenthol, 5.2% neoisomenthol, 17.2% menthol and 71.5% isomenthol. The total "isomenthol isomers" amounted, therefore, to 76.7%.

It will be apparent from the foregoing examples that the temperatures, pressures and duration of the hydrogenation treatment can be varied considerably. In view thereof, it should be understood that the particular procedures represented by the examples cited are intended to be illustrative only and are not intended to limit the scope of the invention.

We claim as our invention:

1. A process for producing a product containing approximately 90 percent of isomenthol isomers which comprises hydrogenating thymol in the presence of Raney cobalt catalyst, said cobalt catalyst being present in an amount of from about 5 to 50 weight percent based upon the weight of thymol, at a temperature of from about 80° to 200° C. and a pressure of from about 100 to 1200 pounds per square inch, and recovering the product.

2. A process for producing a product containing approximately 90 percent of isomenthol isomers which comprises hydrogenating thymol in the presence of Raney cobalt catalyst, said catalyst being present in an amount of from about 5 to 50 weight percent based upon the weight of thymol, at a temperature of from about 105° to 180° C. and a pressure of from about 250 to 900 pounds per square inch, and recovering the product.

References Cited

UNITED STATES PATENTS

| | | |
|---|---|---|
| 1,247,629 | 11/1917 | Brochet. |
| 1,625,771 | 4/1927 | Schollkopf. |
| 2,790,835 | 4/1957 | Peppratt et al. |
| 2,927,140 | 3/1960 | Kaarsemaker et al. |

OTHER REFERENCES

Huckel et al.: Justus Liebigs, Annder Chemie, vol. 637, p. 16 (1960) QD1L7 260–631H.

Emmitt: Catalysis, vol. V, pp. 175–179 (1957) Reinhold Publishing Co., New York, QD501E58.

Aller.: Jour. Applied Chem., vol. 8, pp. 163–165, 492 (1958) TP1J91.

Berkman et al.: Catalysis, Reinhold Pub. Co., New York, pp. 574, 834 (1940) QD501B445.

BERNARD HELFIN, *Primary Examiner.*

H. MARS, *Assistant Examiner.*